United States Patent [19]

Lesea

[11] Patent Number: 4,633,040
[45] Date of Patent: Dec. 30, 1986

[54] PERSONAL BRANCH EXCHANGE SYSTEM

[75] Inventor: Austin H. Lesea, San Jose, Calif.

[73] Assignee: Candela Electronics, Inc., Sunnyvale, Calif.

[21] Appl. No.: 664,774

[22] Filed: Oct. 25, 1984

[51] Int. Cl.⁴ .......................... H04M 3/02; H04M 3/22
[52] U.S. Cl. ..................................... 379/253; 379/379; 379/412
[58] Field of Search .............. 179/18 HB, 84 A, 84 R, 179/81 R, 18 AD

[56] References Cited

U.S. PATENT DOCUMENTS

| | | |
|---|---|---|
| 3,838,223 | 9/1974 | Lee et al. ........................ 179/18 FA |
| 3,903,375 | 9/1975 | DeWit ............................. 179/18 HB |
| 4,273,964 | 6/1981 | Szpindel ........................... 179/84 R |
| 4,355,206 | 10/1982 | Israel et al. ..................... 179/18 HB |
| 4,524,245 | 6/1985 | Littlefield ....................... 179/18 HB |

*Primary Examiner*—Thomas W. Brown
*Attorney, Agent, or Firm*—Thomas E. Schatzel

[57] ABSTRACT

A personal branch exchange telephone system including improved interface circuitry to couple the system to outside telephone lines as well as to individual telephone sets on extension lines in the PBX system. The PBX system is connected to the telephone lines only through electromagnetic coupling and circuitry is provided to detect both ringing signals and loop current carried by the telephone lines.

13 Claims, 3 Drawing Figures

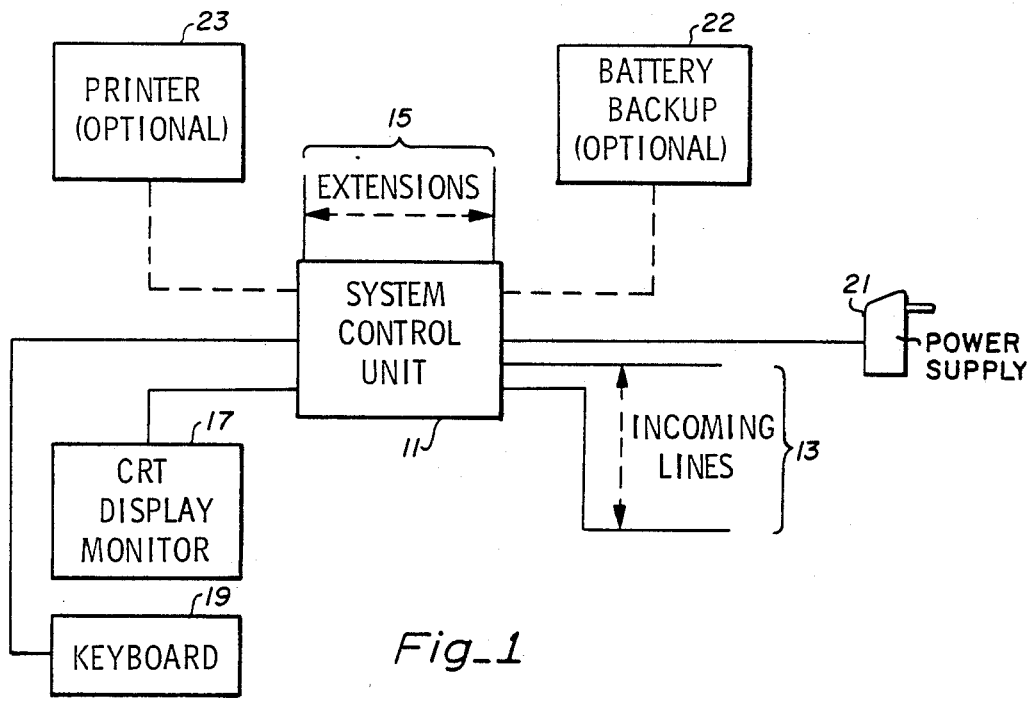
Fig_1
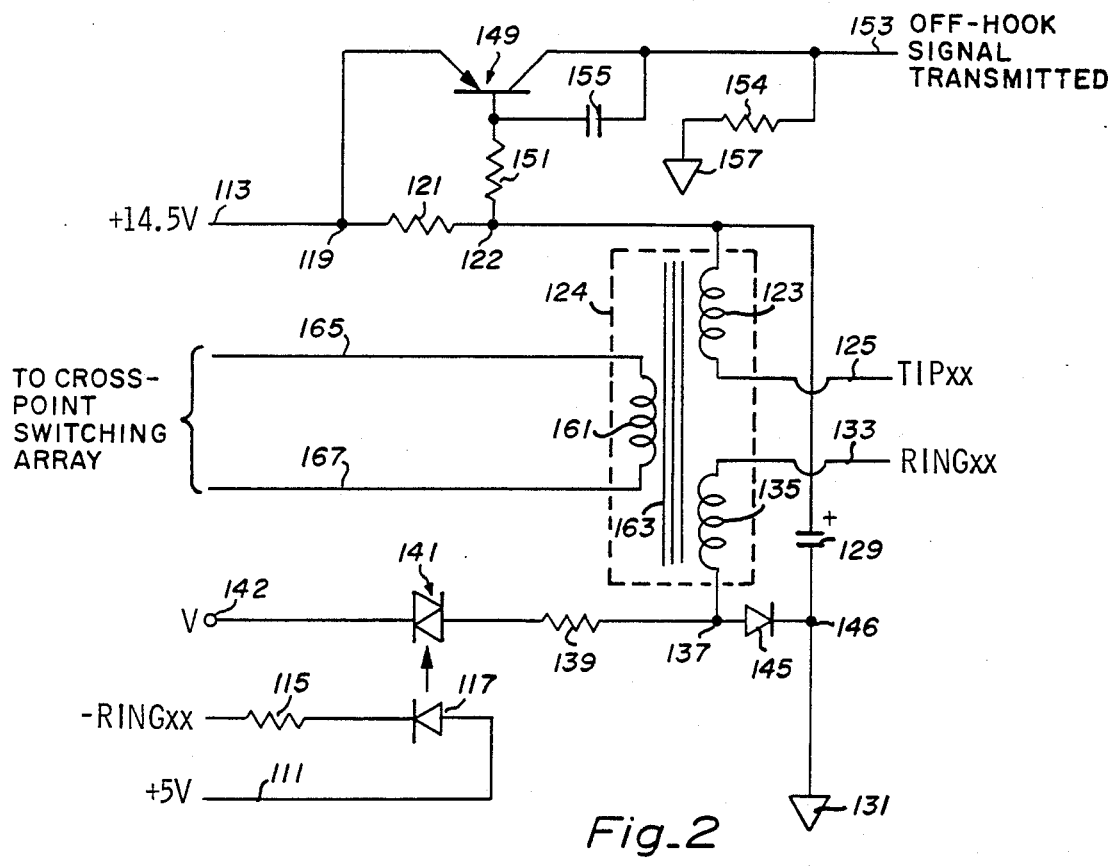
Fig_2

PERSONAL BRANCH EXCHANGE SYSTEM

BACKGROUND OF THE INVENTION

1. Field of the Invention

The present invention relates to a personal branch exchange telephone system and, more particularly, to interface circuitry for use in such a system to couple the system to outside telephone lines as well as to individual telephone sets on extension lines in the PBX system.

2. Description of the Prior Art

Personal branch exchanges (herein PBX's) are telephone system networks which are installed in business offices and similar environments to provide intra-office telephone communication as well as communication between the extension lines in the office and out-going telephone lines to remote locations. With such systems it is necessary to provide circuitry to interface between the PBX system extension lines and the telephone lines such that communication signals are faithfully conveyed into and out of the PBX system. Also, the interface circuitry should be such as to protect the PBX system from any potentially harmful electrical signals carried by the telephone's lines; for example, it is necessary to protect the PBX system from high voltage surges caused by lightning strikes and the like incurred by the telephone lines. Conversely, such interface circuitry should be designed so that high voltage signals are not conveyed from the PBX system to the telephone lines, thereby to avoid damage to the switching equipment associated with the telephone lines, the telephone lines themselves, or personnel servicing the telephone lines.

OBJECTS AND SUMMARY OF THE INVENTION

One primary object of the present invention is to provide a PBX system having interface circuitry to couple the PBX system to telephone lines extending to remote locations, which circuitry functions in an improved manner to protect the PBX from voltage surges carried by the telephone lines.

Another object of the present invention is to provide a PBX system having improved interface circuitry which couples the PBX system to the telephone lines only through electromagnetic coupling.

Yet another object of the present invention is to provide a PBX system having such interface circuitry with improved means to detect ringing signals and loop current carried by the telephone lines.

Another primary object of the present invention is the provision of interface circuitry to couple individual telephone sets on extension lines in the PBX system to a cross-point switching array in the system control unit for the PBX system, which interface circuitry has improved reliability.

Still another object of the present invention is to provide interface circuitry to couple individual telephone sets on extension lines in a PBX system to a control unit for the PBX system, which coupling is achieved solely through electromagnetic means.

Yet another object of the present invention is to provide a PBX system having interface circuitry to couple individual telephone sets on extension lines in the PBX system to a control unit for the system incorporating improved means to sense the occasion of a telephone set being placed in off-hook condition in response to a ringing signal.

In accordance with the preceding objects, the present invention, in one of its embodiments, provides an improved system for establishing an interface between a pair of telephone lines and a PBX system of the type which utilizes dual tone multi-frequency tone keying telephone sets. More particularly, the system includes (a) a parallel network connected to one of the telephone lines of the pair, which network includes the parallel combination of a normally-open relay and first impedance means; (b) a coupling device responsive to audio frequency electrical signals, which device is connected to the other telephone line of the pair to transmit audio frequency information between the telephone lines and the PBX system; (c) a light-emitting diode connected between the parallel network and the coupling device to be energized by either the flow of loop current between the pair of telephone lines or by ringing signals carried between the lines; (d) an optical transducer disposed for energization by the light-emitting diode means; and (e) system control unit means coupled to receive ringing signals transmitted through the optical transducer. The system control unit means is operative to cause closure of the normally-open relay when an associated telephone set in the PBX system is placed off-hook while the optical transducer is energized by a ringing signal transmitted between the light-emitting diode and the optical transducer means.

In the preferred embodiment of the above-described invention, capacitive means are provided in parallel with the light-emitting diode to connect the parallel network to the coupling device, so that audio frequency signals are transmitted without loss to the coupling device upon closure of the normally-open relay.

Also in the preferred embodiment of the circuitry for providing an interface between a pair of telephone lines and a PBX system according to the present invention, a resistor is connected in parallel to the light-emitting diode, and a voltage surge suppressor is connected in parallel to the series combination of the parallel network means and the resistor to protect the PBX system from power surges in the telephone lines.

The present invention also provides improved interface circuitry to couple pairs of extension lines in the PBX system to a control unit for the PBX system including (a) means to transmit signals indicative of ringing signals through a light-emitting diode, (b) means electromagnetically coupled to the light-emitting diode to permit conduction of ringing current to the pairs of extension lines only in response to emissions from the light-emitting diode, and (c) audio signal transmission means separately coupled to the pairs of extension lines to transmit voice-modulated dc audio signals therethrough in the absence of ringing signals.

In the preferred embodiment of the circuitry for providing an interface between a pair of extension lines and a PBX system according to the present invention, the electromagnetic coupling to provide transmission of the ringing signals is provided by a triac coupled between a time-varying negative voltage source and the pair of extension lines such that the flow of current from the negative voltage source is controlled by the triac in response to emissions from the light-emitting diode. Also in the preferred embodiment, detection means are provided to detect the flow of loop current to the pair of extension lines and to terminate the ringing signals upon the detection of such loop current, which flows only when a telephone set on the pair of extension lines is taken off-hook.

Accordingly, an advantage of the present invention is the provision of a PBX system having interface circuitry to couple the PBX system to telephone lines extending to remote locations, which circuitry functions in an improved manner to protect the PBX system from voltage surges carried by the telephone lines.

Another advantage of the present invention is the provision of a PBX system having improved interface circuitry which couples the PBX system to the telephone lines only through electromagnetic coupling.

Yet another advantage of the present invention is the provision of a PBX system having interface circuitry with singular means to detect both ringing signals and loop current carried by the telephone lines.

Another advantage of the present invention is the provision of interface circuitry to couple individual telephone sets on extension lines in the PBX system to a cross-point control unit for the PBX system, which interface circuitry has improved reliability.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a PBX system inclusive of a system control unit according to the present invention;

FIG. 2 is a schematic diagram of circuitry according to one aspect of the present invention to interface between a pair of extension lines and the system control unit of FIG. 1.

DETAILED DESCRIPTION OF THE PREFERRED EMBODIMENT

Figure 3:
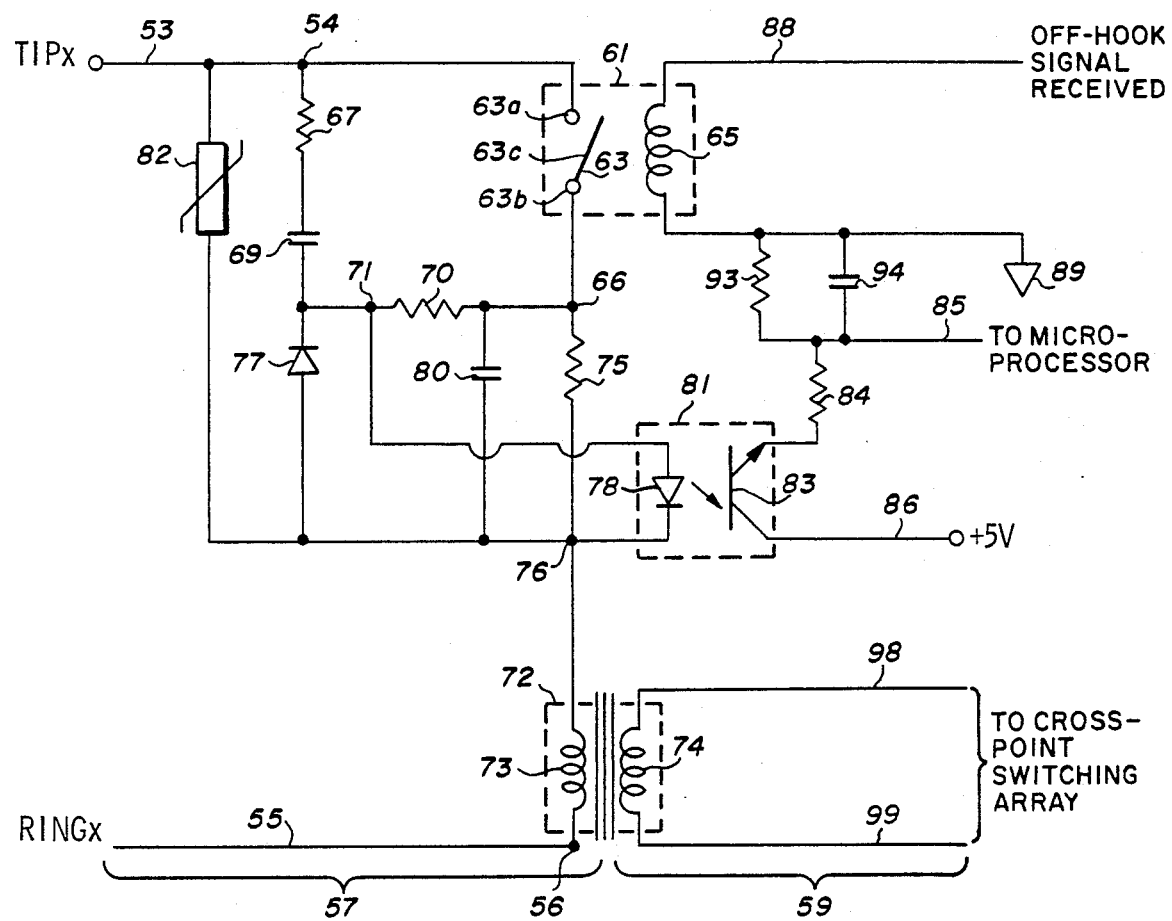
FIG. 3 is a schematic diagram of circuitry according to another aspect of the present invention to interface between a pair of telephone lines and the PBX system control unit of FIG. 1.

As shown in FIG. 1, a PBX system includes a microprocessing based system control unit 11 which receives a plurality of incoming lines 13 which may be understood to be pairs of telephone lines from an outside source. The system control unit 11 includes a conventional cross-point switching array, controlled by the microprocessor, to switch the incoming calls on telephone lines 13 to the various extension lines 15 or, conversely, to switch an outgoing call on one of the extension lines 15 to a pair of the telephone lines 13. A typical PBX system for a moderately-sized office might include eight pairs of incoming lines and fifteen pairs of extension lines.

The system control unit 11 for the PBX system should be understood to include interface circuitry, which will be explained in detail in conjunction with FIG. 3, to couple the incoming lines 13 to the cross-point switching array in the system control unit 11. Further, said interface circuitry protects the PBX system from harmful electrical signals carried by the telephone lines and, conversely, protects the telephone lines from harmful electrical signals generated within the PBX. Also, the system control unit 11 should be understood to include so-called "station interface" circuitry which, as will be explained in detail in conjunction with FIG. 2, receives the extension lines 15 and serves to connect the cross-point array in the switching matrix of the system control unit 11 to the pairs of extension lines leading to individual telephone sets within the office.

The PBX system may further include a display monitor, such as a cathode ray tube 17, to visually indicate the status of the various extension lines 15. Also, a keyboard means 19 may be connected to the system control unit 11 so that commands by a system operator, usually a telephone receptionist, may be entered in the system control unit 11. Typically, these commands will result in a particular pair of incoming line being connected to a particular pair of extension lines. Also, by means of the system control unit, the commands entered through the keyboard 19 may be displayed on the display monitor 17.

The system control unit 11 can receive operating power from a wall-mounted transformer 21 or, optionally, a battery backup system may be provided for sustaining operation for relatively short periods.

Also, a printer unit 23 can be connected to the system control unit 11 so that the status of various functions in the unit 11 can be reduced to a printed form. For example, the output of the printer may reproduce the information on the screen of the display monitor 17, or may reflect information stored in the memory of the system control unit 11. Such information might include, for instance, the historical usage of the various extension lines and the amount of time that telephone sets on particular extension lines have been off-hook.

A primary function of the system control unit 11, as indicated above, is to accomplish interface connection between various of the extension lines 15 and the telephone lines 13. In accomplishing such interconnections, the operation of the PBX system should be such that communication signals from the telephone lines are faithfully conveyed into the PBX system and, likewise, signals originating in the PBX system are faithfully conveyed to the telephone lines while, at the same time, the PBX system is protected from any harmful electrical signals carried by the telephone lines.

To accomplish such functions, the system control unit 11 includes the interface circuitry shown in detail in FIG. 3. As will be readily understood in view of the following description, this circuitry generally includes means to provide the dual function of detecting ringing signals and loop current in the telephone lines. The loop current is normally generated during conversation or data transmission over the telephone lines.

In FIG. 3, the pair of telephone lines 53 and 55 originating at some location remote from the office are labeled respectively $TIP_x$ and $RING_x$. These lines may be understood to terminate at nodes 54 and 56 respectively. It may be assumed, in accordance with standard convention, that telephone line 53 is normally at a higher positive voltage than telephone line 55.

Initially, it should be understood that the circuit network of FIG. 3 is replicated for each pair of telephone lines connected to the PBX system. Thus, for example, where there are eight pairs of incoming telephone lines to the PBX system, the system control unit 11 would include eight circuits duplicative of the one illustrated in FIG. 3.

The bracket 57 in FIG. 3 indicates a circuit array which functions to connect the telephone line 53 to the telephone line 55, and the bracket 59 indicates a circuit array integral to the PBX system. Together, the circuit arrays 57 and 59 interact to couple the PBX system to the telephone lines and, thus, provide an interface across a "barrier" between the telephone lines and the PBX system. An important aspect of the present invention is that no electrical current flows across the barrier; instead, the telephone lines communicate with the PBX system only by means of electromagnetic coupling.

In FIG. 3, a relay means 61 is connected between node 66 and the terminal node 54 of telephone line 53. This relay means 61 includes a normally-open switch means 63 schematically illustrated as having terminals 63a and 63b and a selectively movable arm 63c. It should be understood that closure of the normally-open switch means 63 is electromagnetically controlled by coil 65, which is internal of the relay means 61.

In parallel with the switch means 63 between nodes 54 and 66, is a series arrangement of a resistor 67, a capacitor 69 and a second resistor 70. For purposes of explanation, the combination of the first resistor 67 and the capacitor 69 will be referred to as the impedance means. The junction between the capacitor 69 and the second resistor 70 is designated as node 71. In practice, the resistor 67 has a value of about 30,000 ohms, the capacitor 69 has a value of about 0.40 microfarads, and the resistor 70 has a value of about 900 ohms.

Referring now to the lower portion of FIG. 3, telephone line 55 is connected to an audio signal coupling means, preferably of the type which includes a pair of associated inductive coils 73 and 74. As will be explained in more detail later, the coils 73 and 74 operate together to electromagnetically couple the telephone lines to the PBX system for audio signal transmission. In the circuit array 57, the coil 73 is connected between nodes 56 and 76.

Between nodes 76 and 66 is connected a resistor 75. In practice, resistor 75 has a value of about 270 ohms.

Connected between nodes 71 and 76 is a light-emitting diode 78 which comprises an element of an optical-isolating means 81 which electromagnetically couples a light-sensitive transistor 83 to the light-emitting diode 78.

A capacitor 80 is connected between nodes 66 and 76 in parallel with the resistor 75. For reasons which will be explained in more detail later herein, the capacitor 80 functions to bypass any losses otherwise caused by the resistors 70 and 75 at audio frequencies.

A diode 77 is also connected between nodes 71 and 76 in parallel with the light-emitting diode 78. One purpose of the diode 77, which is connected in a direction opposite to diode 78, is to prevent the light emitting diode 78 from being reverse biased if the trunk lines 53 and 55 are reversed (that is, if telephone line 55 were connected to node 54 and telephone line 53 were connected to node 56). In other words, the diode 77 provides a reverse current path through the trunk circuitry to bypass the light-emitting diode 78.

A conventional voltage surge suppressor 82 is connected between nodes 54 and 76. The purpose of the voltage surge suppressor is to provide a pathway for currents arising from high voltage surges to bypass the circuitry associated with the relay 61 and the circuitry associated with the optical-isolator 81. In other words, surge suppressor 82 is a protection device to protect the interface circuitry from extreme current conditions which might occur, for instance, when lightning strikes a telephone line or when a telephone line contacts an electric power line. In essence, the voltage surge suppressor is a non-linear resistance component whose resistance to current flow decreases dramatically with increasing voltages, especially voltages above 220 volts. For example, the voltage surge suppressor 82 might have a resistance of many thousands of ohms at low voltages but a resistance of only about ten ohms at voltages of 220 volts or above. In still other words, the voltage surge suppressor 82 acts as an open circuit at low voltages and as a short circuit at high voltages.

At this time, the general operation of the circuit array encompassed by the bracket 57 can be understood. Assuming that switch 63 in the relay means 61 is initially in an open position and that a call is originated from a remote location, the telephone lines 53 and 55 will initially carry a ringing signal. Typically, the ringing signal will be an alternating voltage of about 60 to 90 volts (rms) with a frequency of about 20 hertz (cycles per second). Such a signal will cause current to flow from node 54 to node 71 via the resistor 67 and the capacitor 69. (It may be noted that capacitor 69 will function to block steady-state dc voltages, but not the ac ringing signals.) From node 71, positive portions of the ringing signal voltage will cause current to flow to node 76 via the light-emitting diode 78 which, in comparison to resistors 70 or 75, presents negligible resistance to current flow in the "forward" direction. (Typically, the voltage drop across diode 78 would be about 1.6 volts for positive-going excursions of the ringing signals.) Between nodes 71 and 76, negative portions of the ringing signal voltage will cause current to flow to node 71 via the diode 77. From node 76, current flows to telephone line 55 through the coil 73. Because the ringing signals have relatively low frequency (again, typically about 20 hertz), the coil 73 provides little impedance to the ringing signals.

When the aforementioned current flows through diode 78, it emits light in response to the ringing signal voltages; accordingly, the light-emitting diode 78 will pulsate on-and-off to create an optical signal which is an analog of the electrical ringing signal. Via the light-conducting circuitry of the optical isolator 81, the pulses of light from the diode 78 will be transmitted to the light-sensitive transistor 83. In response, the transistor 83 operates as an optical transducer which will transmit current during the period when it receives light pulses at its base, and otherwise not. Thus, the light-sensitive transistor 83 will create an electrical analog of the ringing signals within the PBX network.

When a ringing telephone set is "answered" in the PBX system, circuitry in system control unit 11 of the PBX system will cause energizing current to flow through the coil 65 in the relay 61. With the coil 65 energized, the relay means 61 will operate to close the switch 63, thereby permitting current to flow unimpeded through the switch from node 54 to node 66 in the circuit array 57.

Closure of the switch 63 will effectively cause a short circuit between nodes 54 and 66 and, hence, will cause a substantial reduction in the effective impedance of the circuit array 57. In response to the impedance change, the central office of the telephone company will terminate the ringing signals. At this point, the outside calling party will be connected with the PBX system for purposes of audio signal transmission, and accordingly, voice-modulated dc current signals can be carried by telephone lines 53 and 55. This dc current includes the aforementioned loop current. Such audio-frequency signals will flow from node 54 to node 66 through the switch 63. From node 66, the voice-modulated dc current signals will pass through the capacitor 80 to the node 76, thence through the coil 73 to the telephone line 55. Also from node 66, the dc loop current will flow through resistor 70 and then through the light-emitting diode 78 to node 76.

The capacitor 80, having a typical value of about two microfarads, permits passage of the time-varying components of the dc loop signals without energy loss as compared, for example, to the pathway through the resistor 75. Accordingly, as mentioned earlier, the capacitor 80 bypasses energy losses which would otherwise be caused by the resistors 70 and 75.

At this juncture, it may be appreciated that neither the dc loop current nor the ringing signals will pass through the voltage surge suppressor 82. Likewise, the positive dc loop current will not pass through the diode 77 from node 71 to node 76.

From node 76, voice-modulated dc current signals will pass through coil 73 of the inductive coupling device 72. These signals will energize the coil 73 and cause electromagnetic coupling to coil 74. Thus, the voice modulated dc signals will be transmitted into the PBX system without flow of electrical current from the telephone lines into the PBX system. From coil 74, the voice-modulated dc current signals will be conveyed to the cross-point switching array of the system control unit 11 via the PBX lines 98 and 99.

With the preceding description in mind, it may be appreciated that there are four conditions for current flow through the light-emitting diode 78. One condition is the ringing current condition, which occurs when switch 63 is open and is characterized by distinctive pulsations of light from the light-emitting diode resulting from the ac nature of the ringing signals. The second condition is the voice-modulated dc current condition which occurs when the switch 63 is closed and loop current is flowing. This second condition results in the light-emitting diode providing an essentially steady emission of light. The third condition is a zero current situation which occurs with switch 63 open and no ringing current signals are received in the circuit array 57. The fourth condition is the zero current situation with the switch 63 closed and no loop current is flowing in the circuit array 57. During the two zero current conditions, the light-emitting diode will not, of course, emit light.

These four conditions, or informational states, can be advantageously utilized within the signal processing unit which is a part of the system control unit 11 of the PBX system. For example, when a zero current condition follows the ringing current condition, this usually is an indication that the outside calling party has decided to terminate the attempted call and, therefore, the microprocessor in the system control unit can cause the associated ringing signal in the PBX system to be terminated. Or, when a zero current condition is sustained in circuit array 57 for a predetermined time period following a loop current condition, this indicates that the outside party has terminated the call and, therefore, the system control unit 11 can cause termination of the associated connections within the cross-point switching array of the PBX system.

With the preceding description in mind, the dual function of the light-emitting diode 73 can be appreciated. First, the diode serves to transmit ringing signals into the PBX system electromagnetically. Second, after ringing signals are terminated, the diode serves to monitor loop current and, hence, provide information to the PBX system as to whether loop current is, or is not, present.

It should also be observed that, in the illustrated system, the various functions provided by the light-emitting diode 78 in the presence of loop current can be disabled by reversing the telephone lines 53 and 55. In such a case, loop current will flow through the diode 77, bypassing the light-emitting diode 78.

Turning now to the circuitry embraced by the brackets 59 in FIG. 3, it will be observed that the collector of the light-sensitive transistor 83 in the optical-isolator 81 is connected to a constant voltage source 86 having a value, for example, of +5 volts. The emitter of the transistor 83 is connected, via a resistor 84, to line 85 which extends to the microprocessor in the system control unit 11. The resistor 93 in series with the resistor 84 provides a voltage divider and a pathway to ground 89. The capacitor 94, which preferably has a value of about 1 microfarad, is essentially a high frequency filter; that is, the capacitor 94 will pass high frequency noise signals (in practice, ones substantially above twenty hertz) to ground 89 and, thus, such noise signals will not be carried on line 85.

The optical-isolating means 81 operates in a relay-like manner. That is, the transistor 83 operates as a normally-open switch which prevents the flow of current from the voltage source 86 unless the transistor is energized by the light-emitting diode 78. Further, the waveform which is transmitted by the transistor 83 will simulate the waveform of the signal passing through the light-emitting diode 78. Thus, when a ringing signal is transmitted through the light-emitting diode 78 to cause the light from the diode to pulsate at a rate of about twenty times per second, an analogous electrical signal will be generated by the transistor 83 as it "opens and closes" twenty times each second to modulate the flow of current from voltage source 86.

The microprocessor portion of the system control unit is designed and programmed to detect analog ringing signals carried by line 85. Such ringing signals are transmitted through the system control unit 11, with or without intervention of the telephone receptionist, and then reproduced on one or more selected individual pairs of extension lines 15 connected to the telephone sets in the PBX system. Further, as is described in conjunction with FIG. 2, the system control unit 11 is electrically connected to the telephone receivers to detect when one is placed off-hook. Accordingly, when the system control unit receives a ringing signal and a subsequent off-hook signal from a telephone set, the system control unit operates to provide a signal on line 88 in FIG. 3. This "off-hook" signal energizes the relay coil 65 and then passes to ground 89. As mentioned previously, with the coil 65 energized, the relay means 61 will cause the normally-open switch 63 to close. With switch 63 closed, loop current will flow through circuit array 57 and voice-modulated dc signals passing through coil 73 will be reproduced in coil 74 and carried via lines 98 and 99 to the cross-point array switching matrix in the system control unit 11. At the switching matrix, these voice-modulated dc signals will be connected to the same telephone set as were the associated ringing signals and, thus, a "voice path" will be established.

With the above-described connections completed, lines 98 and 99 in the circuit array 59 will also carry voice-modulated dc signals originating with the called party on the PBX system. Such signals will energize coil 74, will be reproduced electromagnetically in coil 73, and will be carried to the calling party on telephone lines 53 and 55. Thus, conversation or other data transmission will be accomplished between the calling party and the called party via the voice path through the PBX system.

FIG. 2 illustrates circuitry to interface between a standard multifrequency tone keying telephone set, commonly referred to as Touch Tone® set, and the system control unit 11 of FIG. 1. In a physical embodiment of the present invention, the circuitry of FIG. 2 would be integral to the system control unit 11, from which the individual extension lines 15 would lead to the various telephone sets. For that reason, in the following discussion, the circuit of FIG. 2 will be referred to as a station interface circuit. In FIG. 2, the lines 125 and 133 to an individual telephone set are designated TIP$_{xx}$ and RING$_{xx}$, which designations indicate the station tip and station ring conductors, respectively.

Initially, it should be noted that the station interface circuit of FIG. 2 is replicated for each pair of extension lines in the PBX system. Thus, for example, where there are fifteen pairs of extension lines, the system control unit 11 would include fifteen station interface circuits duplicative of the one shown in FIG. 2.

FIG. 2 may best be understood by considering first the circuitry in the lower left portion of the drawing. One terminus of line 111 is connected to a constant voltage source, say at +5 volts. The other terminus of line 111 is connected to the system control unit 11 to carry a signal indicative of a ringing signal on the line from the system control unit. This control ringing signal, which typically has a value between from +5 volts to zero volts may be understood to originate in the system control unit 11. Further, it should be understood that the microprocessor included in the system control unit 11 determines the particular station line 111 to which the ringing signals are applied.

Connected in series in the line 111 is a resistor 115 and an infrared light-emitting diode 117. As will be explained in detail below, light emissions from diode 117 carry ringing signals into the remainder of the station interface circuitry.

At node 119 of the station interface circuitry of FIG. 2 is connected a constant dc voltage source 113, typically about 14.5 volts, whose function is to provide energy for the flow of loop current from the station interface circuitry to the individual telephone set connected to the interface circuitry via lines 125 and 133. Connected between nodes 119 and 122 is a resistor 121 having a typical value of about 160 ohms. At node 122 is connected a first audio signal inductance coil 123 which is part of an audio signal transformer 124. From inductance coil 123 extends the extension line 125 leading to an individual telephone set (not shown) of the multifrequency tone keying type.

Also connected at node 122 is a capacitor 129 leading to ground 131. Typically, the capacitor 129 has a value of about ten microfarads. It may be appreciated that the capacitor will act as an open circuit to the loop current generated by the constant dc voltage source 113 under steady state conditions. Also, it will be appreciated that capacitor 129 acts as a short circuit to ground 131 for voice-modulated dc signals superimposed upon the loop currents during audio communications.

Extension line 133 in FIG. 2 extends to the same individual telephone set as line 125, and in parallel therewith. Also, line 133 is connected to a second audio signal inductance coil 135 which is also a part of the audio signal transformer 124. The coil 135 is also connected to the ground 131 via a diode 145 connected between nodes 137 and 146.

At node 137, the second inductance coil 135 is connected to a resistor 139 in series with a triac 141. The triac is further connected to the voltage source 142 which varies from +5 volts to −180 volts at about 20 hertz.

According to the present invention, the triac 141 is optically coupled to the light emitting diode 117 in line 111 so that conductance of the triac is controlled by the diode in a manner analogous to the arrangement in FIG. 3 wherein the light emitting diode 78 controls conductance of the transistor 83. This coupling between the triac 141 and the diode 117 is indicated by the vertical arrow in FIG. 2.

Referring now to the upper portion of the station interface circuitry of FIG. 2, connected at nodes 119 and 122 is means to detect the flow of loop current between the two nodes. The illustrated detector means comprises a transistor 149 having its emitter connected at node 119, its base connected at node 122 via a resistor 151, and its collector connected to an output line 153 leading to logic circuitry in the system control unit 11. Capacitor 155 is coupled between the emitter and the base of the transistor 149, and together with resistor 151, functions as a feedback means to integrate the input to the transistor. Preferably capacitor 155 has a value of about 0.018 microfarads and resistor 151 has a value of several hundred thousand ohms.

Further, the station interface circuitry of FIG. 2 includes a third inductive coil 161 which, together with a core member 163, completes the audio signal transformer 124. Connected to the coil 161 are a pair of wires 165 and 167 which lead to the cross-point switching array included in the system control unit 11. The cross-point array, which is a well-known switching component, essentially functions to connect the lines 98 and 99 of FIG. 3 with the lines 165 and 167 of FIG. 2. Through such coupling, audio signals received by a selected one of the interface circuitries of FIG. 3 are transmitted to a selected one of the station interface circuitries of FIG. 2, and vica versa.

With the preceding description in mind, the function and operation of the circuitry of FIG. 2 can be readily understood.

For purposes of explanation, it may be assumed that operation of the station interface circuitry is initiated by a signal indicative of a ringing signal carried on line 111, which signal is generated by the system control unit 11. Such a signal will cause the infrared light-emitting diode 117 to emit light. Through electromagnetic coupling to the triac 141, the emissions from the light-emitting diode 117 will cause the triac 141 to be either in a conducting or nonconducting state. When the triac is in the conducting state, the triac will allow ac ringing current to flow from the voltage source 142, through extension line 133 to the associated telephone set. Then, the ringing signals will return on extension line 125 and flow to ground 131 via capacitor 129. (Although the ringing signals pass through coils 123 and 135, the relatively small impedance of those coils to such signals is not significant for purposes of the present discussion.) At the selected telephone set, the ringing signal carried by extension lines 125 and 133 will activate a bell or similar ringing means in a conventional manner.

During the time that the telephone set connected to the extension lines 125 and 133 is on-hook, the diode 145 will not conduct loop current from source 113. This is due to the substantial resistance provided by the telephone set, which results in the voltage at node 137 being the threshold conduction voltage of the diode 145 (typically, about 0.7 volts). And, since the capacitor 129 acts as an open circuit to the dc loop current, it may be understood that there is only negligible loop current flowing in the circuitry of FIG. 2 while the telephone set is on-hook.

Also, so long as the telephone set connected at lines 125 and 133 is on-hook, the diode 145 will not conduct ringing current from voltage source 142. This is because the diode 145 is connected opposite to the orientation which would permit current flow from the negative potential of the voltage source 142.

When the telephone set connected to extension lines 125 and 133 is placed off-hook in response to ringing signals (i.e., when the call is answered), the resistance across lines 125 and 133 will decrease substantially. The decrease in resistance will cause a substantial flow of loop current through lines 125 and 133, which current will flow to ground 131 via diode 145. The flow of loop current will also cause voltage drops across resistors 121 and 151, thereby causing the transistor 149 to begin conducting and, hence, providing current through line 153.

During the period of conduction of transistor 149, the capacitor 155 and resistor 151 provide an integration function which somewhat smooths the output. Resistor 154 provides a path to ground 157 for the current on line 153.

The current in line 153, which will only flow when the telephone set at lines 125 and 133 is placed off-hook, provides a signal to the system control unit 11 indicating the off-hook condition. In response, the system control unit will activate a latch circuit or the like to terminate the flow of ringing current in line 111. Also, in response to the off-hook condition of the telephone set, as sensed on line 153, the system control unit 11 will activate the relay means 61 in FIG. 3 and this, as previously explained, will cause the outside telephone office to terminate the ringing signals. With the ringing signals terminated by the outside telephone office, the optical-isolator 81 in FIG. 3 will no longer receive the ringing signals and, hence, such signals will not be transmitted via the system control unit 11 to the line 111.

Then, in the absence of ringing signals on line 111 to activate the light-emitting diode 117, the triac 141 will not conduct and, hence, the ringing voltage source 142 will be effectively removed from the circuit. In other words, the voltage source 142 is only effective in the circuit during the period of ringing signals.

Once the ringing signals on line 111 have been terminated, audio communication can commence between the outside calling party and the called party on the associated PBX extension lines. Referring specifically to the station interface circuitry of FIG. 2, such audio signals generated by the called party are carried from the individual telephone set via lines 125 and 133 to the audio signal transformer 124. In the transformer, the audio signals generated in coils 123 and 135 by the called party are electromagnetically reproduced in the third coil 161; those signals are carried, via lines 165 and 167, to the aforementioned cross-point switching array in the system control unit 11. In the switching matrix of the cross-point array, the audio signals are switched to the appropriate interface circuit as was described in conjunction with FIG. 3 and, from that circuitry, the audio signals are carried to the outside calling party. Likewise, audio signals originated by the outside calling party are carried through the interface circuitry of FIG. 3, through the switching matrix of the cross-point array and then through the audio signal transformer 124 of the station interface circuitry of FIG. 3 to the extension lines 125 and 133 connected to the telephone set of the called party.

During the time that the extension line is off-hook and audio communication is occurring, the loop current for such communication in the station interface circuitry of the PBX system is provided by the voltage source 113. From that source, as shown in FIG. 2, voice-modulated dc current flows through resistor 121, thence through the coils 123 and 135 to ground 131 via the diode 145.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A personal branch exchange system having improved interface circuitry to couple the system to a pair of telephone lines extending to a remote location, comprising:
   (a) parallel network means connected to one of the telephone lines of the pair, the parallel network means including a parallel combination of a normally-open relay means and an impedance means;
   (b) coupling means responsive to electrical signals at audio frequencies connected to the other telephone line of the pair;
   (c) light-emitting diode means connected between the parallel network means and the coupling means and operative to be energized by both the flow of loop current between the pair of telephone lines and by ringing signals carried between the pair of telephone lines;
   (d) optical transducer means disposed for energization by the light-emitting diode means; and
   (e) system control unit means coupled to receive signals transmitted through the optical transducer means, the system control unit means being operative to cause closure of the normally-open relay means when an associated telephone set in the personal branch exchange system is placed off-hook while the optical transducer means is energized by the ringing signals transmitted through the light-emitting diode means and the optical transducer means;
   whereby, upon closure of the normally-open relay means, loop current passes through the relay means, rather than through the impedance means, and operates to carry audio frequency signals through the coupling means into the personal branch exchange system.

2. The system of claim 1 further including:
   resistor means connected in parallel with said diode means, said resistor means providing at least an order of magnitude of less resistance than said impedance means.

3. The system of claim 2 further including:

voltage surge suppressor means connected in parallel to the series combination of the parallel network means and said resistor means to protect the system from power surges in the telephone lines.

4. The system of claim 1 further including:

capacitive means connected in parallel with the light-emitting diode means to connect the parallel network means to the coupling means, so that audio frequency signals are transmitted without loss to the coupling means upon closure of the normally-open relay means.

5. The imrpoved method of operation of a personal branch exchange (PBX) system to couple the system to a pair of telephone lines extending to a remote location, comprising the steps of:

(a) transmitting ringing signals to a parallel network means connected to one of the telephone lines of the pair, the parallel network means including a parallel combination of a normally-open relay means and an impedance means; then (b) transmitting the ringing signals through a light-emitting diode connected between the parallel network means and the other telephone line of the pair; then (c) upon a telephone set being placed in an off-hook condition in the PBX system in response to the transmitted ringing signals, closing the normally-open relay means;

(d) subsequently transmitting voice-modulated dc signals through the closed relay means and the light-emitting diode; and (e) opening the normally-open relay means in response to negating said off-hook condition.

6. In a personal branch exchange (PBX) system, improved interface circuitry to couple a pair of extension lines in the PBX system to a system control unit for the PBX system, comprising:

(a) means to transmit ringing signals through a light-emitting diode;

(b) means electromagnetically coupled to the light-emitting diode to permit conduction of ringing current to the pair of extension lines only in response to emissions from the light-emitting diode; and (c) audio signal transmission means separately coupled to the pair of extension lines for transmitting externally initiated voice-modulated dc audio signals therethrough in the absence of ringing signals.

7. The improved interface circuitry of claim 6 wherein the means electromagnetically coupled to the diode is a triac.

8. The interface circuit of claim 7 wherein the triac is coupled between a time-varying voltage source and the pair of extension lines such that the flow of current from the time-varying voltage source is controlled by the triac in response to emissions from the light emitting diode.

9. The interface circuitry of claim 6 further including detection means to detect the flow of loop current to the pair of extension lines.

10. The interface circuitry of claim 9 wherein said detection means comprises a transistor connected to transmit current in response to the flow of loop current to the pair of extension lines.

11. The interface circuitry of claim 9 wherein said detection means is connected to the means to transmit ringing signals to terminate such signals when a telephone set on the pair of extension lines is placed in off-hook condition.

12. The improved method of operation of the personal branch exchange (PBX) system of claim 5 wherein, a plurality of pairs of telephone lines are coupled to the PBX system through the use of a plurality of circuit elements.

13. The improved interface circuitry of claim 6 including, a plurality of the improved interface circuitry with each improved interface circuitry having means for coupling to a pair of extension lines in the PBX system.

* * * * *